Aug. 20, 1963   R. H. ENGELMANN   3,101,406
ELECTRONIC INTEGRATING CIRCUIT
Filed June 2, 1960   2 Sheets-Sheet 1

INVENTOR
RUDOLPH H. ENGELMANN

BY *Roland G. Anderson*

ATTORNEY 3,101,406
ELECTRONIC INTEGRATING CIRCUIT
Rudolph H. Engelmann, Castro Valley, Calif., assignor to the United States of America as represented by the United States Atomic Energy Commission
Filed June 2, 1960, Ser. No. 33,602
4 Claims. (Cl. 235—183)

This invention relates to electronic integrating circuits, and more particularly to a compact electronic integrating circuit which is capable of directly integrating signals of low voltage magnitudes.

The integration of an electronic signal, voltage or current, by prior art devices has been performed by various circuits employing the same general scheme. This scheme is based upon the charging of a capacitor in accordance with the signal to be integrated such that the charge accumulated on the capacitor represents the integral of the signal. This method utilizes the well-known current-voltage relationship associated with a capacitor which is that $$v = K \int i \, dt$$

where $v$ is the voltage across the capacitor, $K$ is a constant representing the capacitance of the particular capacitor used, and $i$ is the current that has charged the capacitor. Thus the measure of voltage across a capacitor indicates the integral of a current signal into the capacitor over a time $dt$.

Whereas this prior art method seems relatively simple and straightforward, a number of drawbacks are inherent in it and limit its use. In order to obtain accurate integration with a capacitor charging system, the input signal must have a relatively large potential magnitude of the order of volts, and constant current or regulated voltage supplies must be used to supply the system. When the input signal has a potential magnitude of the order of millivolts or less it must be amplified into the volt range prior to application to the integrating circuit. Amplifiers, constant current supplies and regulated voltage sources which must hence be utilized in conventional capacitor charging integrating circuits introduce a number of sources of error and non-linearity which can only be overcome by using expensive complicated apparatus and components of the most refined nature.

The present invention employs a transistor and a capacitor in such a novel manner as to eliminate the need for constant current supplies, regulated voltage sources or amplifiers, even when the signal to be integrated is in the millivolt range. The circuit consists essentially of a condenser and means for initially charging the condenser to a predetermined starting voltage. The condenser is arranged to discharge through a transistor, the current flow through which is substantially independent of condenser voltage but proportional to the input current through the base of the transistor. At the end of the integration period the capacitor voltage is less than its initial value by an amount proportional to the integral of the input signal. The period of integration can be continuous or composed of a number of separated time intervals determined by biasing the base with a signal which regulates the period in which the transistor can conduct current.

Accordingly, it is an object of the invention to provide an improved electronic circuit for accurately integrating an electronic signal.

It is another object of this invention to provide a means for integrating an electronic signal without the use of constant current supplies, regulated voltage supplies, or amplifiers.

It is another object of this invention to provide a transistorized integrating circuit.

It is a further object of this invention to provide an electronic integrator which can operate continuously or periodically.

A still further object is the provision of an integrating circuit of the class described which is capable of accurately directly integrating signals having relatively small voltage magnitudes in the millivolt range.

Further objects of the invention will appear from the following description in which is set forth the preferred embodiment of the invention.

Referring to the drawings.

Figure 1:
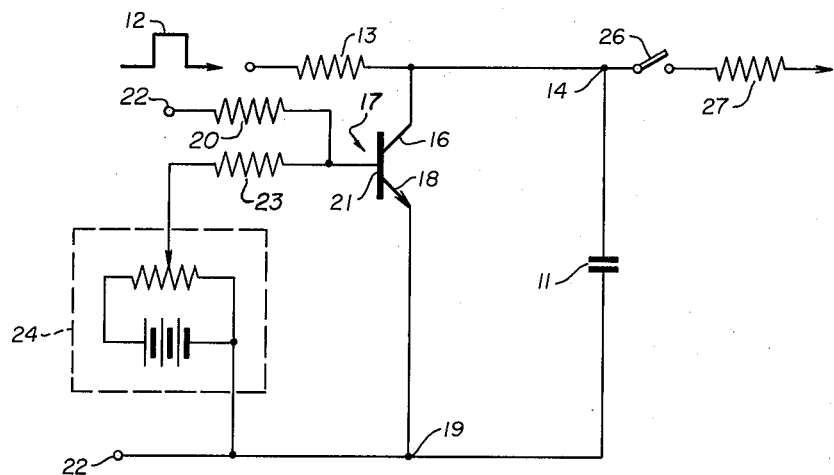
FIGURE 1 is a schematic diagram of the basic circuit of the invention where the capacitor is charged by an input pulse.

Referring to FIG. 1, there is shown the basic circuit of the present invention wherein a capacitor 11 is charged to any desired starting voltage that can be placed across it by introducing a charging pulse 12 through a current limiting resistor 13 to terminal 14 of the capacitor 11. In order that the capacitor be charged in this manner to the predetermined starting voltage, the magnitude of pulse 12 must be equal to such starting voltage magnitude and have a duration of no less than five times the time constant of resistor 13 and capacitor 11; the time constant T is equal to RC where R is the resistance in ohms of resistor 13 and C is the capacitance of capacitor 11 in farads.

Terminal 14 is connected to the collector 16 of a transistor 17, which can be of either the silicon or the germanium variety. The transistor is connected in what is commonly referred to as the common emitter configuration with its emitter 18 connected to a terminal 19 on the opposite side of capacitor 11 from terminal 14. The base 21 of transistor 17 is connected to one of a pair of input terminals 22 through a current limiting resistor 20, the other input terminal being connected to terminal 19. The base 21 is biased by means of a variable voltage supply 24 which delivers current to base 21 through a resistor 23 which is connected to the base. To facilitate measurement of the voltage remaining on capacitor 11 when the integration has been completed, a switch 26 and resistor 27 are serially connected to terminal 14. A voltmeter or the like (not shown) may be hence connected to resistor 27 whereby the voltage on the capacitor can be read at any desired time upon closure of switch 26.

In the operation of the circuit described in FIGURE 1, capacitor 11 is charged to a starting voltage $V_o$ by application of pulse 12 through resistor 13 to terminal 14. The input is connected across terminals 22 and the bias voltage source 24 is regulated to bring the transistor above cut-off and into a linear operating range. The amount of current drawn from capacitor 11 by collector 16 is proportional to the amount by which the voltage at the base 21 of transistor 17 is above the cut-off voltage. Thus the input signal controls the magnitude of current drawn from the charged capacitor and does so in such a way as to integrate the input signal. When the integration period is over the switch 26 is closed and the voltage remaining across the capacitor is measured by appropriate means such as an oscilloscope or voltmeter connected to resistor 27 as an indication of the integral of the input signal.

Figure 3:
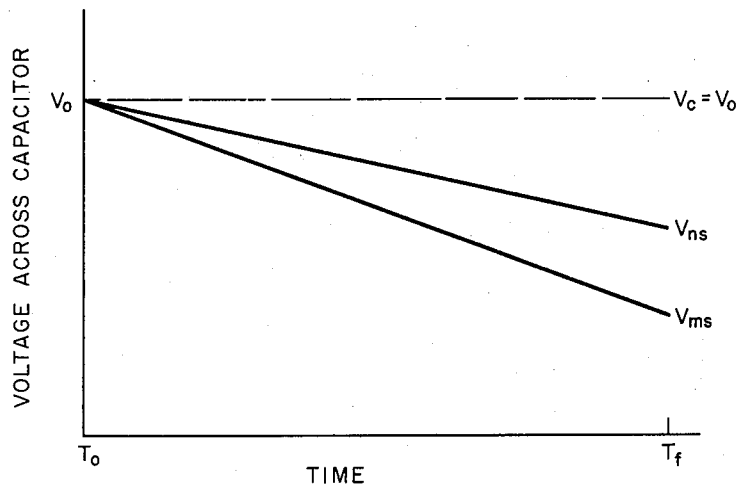
FIGURE 3 is a graphic illustration of the discharge of the capacitor of the embodiments of FIGS. 1 and 2.

As mentioned above, the bias voltage not only brings the transistor above cut-off but also puts it in a linear operating range. This means that even in the absence of an input signal, capacitor 11 will be discharged a certain amount proportional to the amount by which the bias voltage is above the cut-off voltage. This is illustrated in FIGURE 3 where $V_{ns}$ denotes the voltage across the capacitor at the end of the integration interval when no signal (ns) has been present at input terminals 22.

When a signal is present at input 22, the circuit parameters are so adjusted that if the maximum signal present in the data to be integrated were to be sustained for the entire integration period, a voltage, $V_{ns}$, would still remain across the capacitor instead of the capacitor having been completely discharged. By assuring that the maximum discharge possible over a given integration period is only a portion of the original voltage, $V_o$, the system is restricted to operation in the most linear operating region of transistor 17. If the minimum signal present in a set of data is negative and adjusted to bring the base just to cut-off, a minimum signal sustained over the entire integration period would keep the transistor in cut-off for the entire time and no discharge would take place. The remaining voltage, $V_c$, across capacitor 11 for an entire period of cut-off conditions would be exactly equal to $V_o$, the original starting voltage. The integration period shown in FIGURE 3 is from $T_o$ integration starting time to $T_f$ integration terminating time.

Consider now a general signal introduced at terminals 22 which varies between minimum and maximum values and is negative part of the time and positive part of the time. Such a signal whose net integral is positive will leave a voltage across capacitor 11 which lies between $V_{ns}$ and $V_c$, while a signal whose net integral is negative will leave a voltage between $V_{ms}$ and $V_{ns}$. A signal whose net integral is zero (equal negative and positive areas) will leave exactly $V_{ns}$ volts across capacitor 11. Thus the measured voltage remaining on the capacitor is indicative of the polarity as well as the magnitude of the integral of the input signal.

The basic circuit of FIGURE 1 may be variously modified to meet particular requirements. For example, in some applications it is desirable that the integration period of the circuit be automatically regulated. To this end the circuit may be modified as shown.

Figure 2:
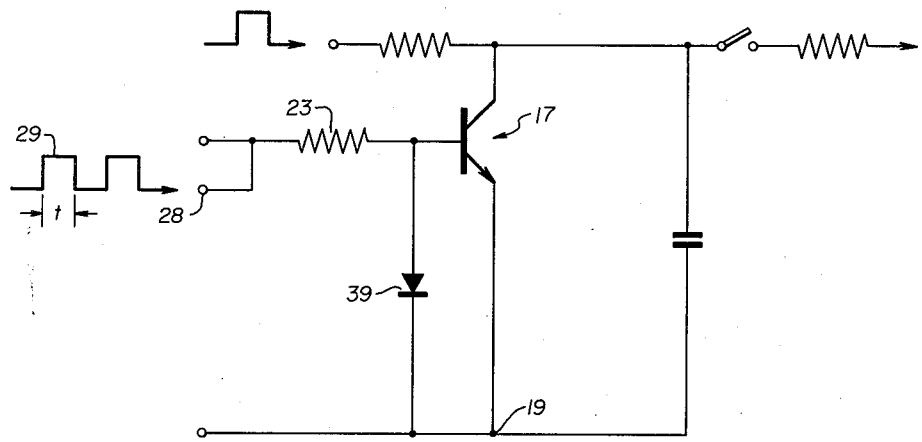
FIGURE 2 is a schematic diagram of the circuit of FIG. 1 as modified for ready regulation of the integration periods.

In FIGURE 2 there is depicted a circuit of the same basic nature as described above but having a terminal 28 connected to the input side of resistor 23 in place of the variable voltage supply 24 shown in FIGURE 1. When a voltage square wave 29 is applied to terminal 28 the integrator will only integrate for specific time periods. These periods are characterized by a time duration, $t$, of the square wave, and occur at intervals which depend upon the frequency of the wave. In effect the square wave only biases the transistor to conduct for prescribed lengths of time and at specific intervals rather than continuously as in the case of the circuit of FIGURE 1.

Figure 4:
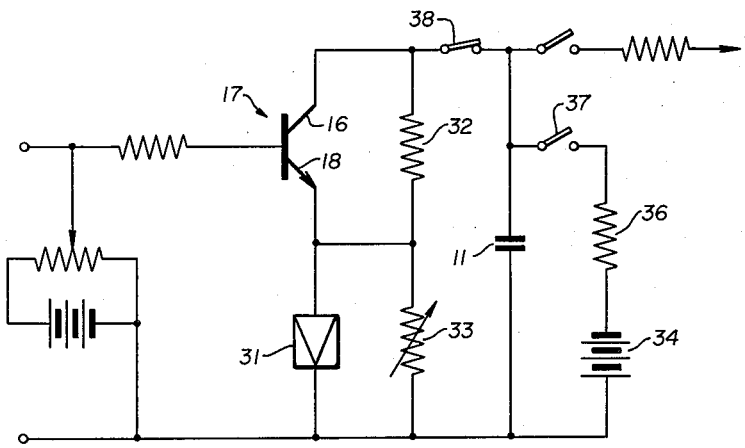
FIGURE 4 is a schematic diagram of a further embodiment of the basic circuit as arranged to provide extremely high accuracy.

If extremely high accuracy is desired a modified circuit as shown in FIGURE 4 is employed. This circuit makes use of the negative characteristics of a tunnel diode to compensate for changing emitter current due to changing collector voltages. If not compensated the changing emitter current causes a slight non-linearity to exist for the initial portion of the integration. By choosing a transistor with low emitter resistance this non-linear effect can be held to a small enough error to be neglected in all but the most exacting measurements. For these high accuracy integration measurements a tunnel diode 31 placed in series with the emitter, and a voltage divider, composed of resistor 32 and variable resistor 33, will compensate the emitter error and thereby provide near perfect linearity over the entire integrating period. Resistor 32 is connected at one of its terminals between collector 16 and capacitor 11, and at its other terminal to emitter 18. Resistor 33 is connected at one of its ends to emitter 18 and at its other end to capacitor 11. The non-linearity of the emitter is caused by a decreasing emitter current with decreasing collector voltage. The tunnel diode has the peculiar characteristic of a negative resistance and a decreasing voltage across it causes an increasing current through it. The resistors 32 and 33 cause the voltage across the tunnel diode to be proportional to the collector voltage and thus a decreasing collector voltage causes an increasing current through the diode 31 which compensates for the decreasing current from the emitter.

FIGURE 4 also illustrates an alternative means for initially charging capacitor 11. A battery 34 in series with a resistor 36 is switched across capacitor 11 by means of switch 37. When the capacitor is fully charged switch 37 is open and the circuit operated in its normal manner. When a tunnel diode is used as illustrated in FIGURE 4, a switch 38 must be additionally provided between the voltage divider resistors 32, 33 and the capacitor to prevent a current path during the charging of the capacitor, and must be open while battery 34 is charging and closed when switch 37 is open and operation desired.

Another possible modification of the present invention is illustrated in FIGURE 2 and applicable to any of the circuits described. The modification consists of placing a diode 39 of the same type as the transistor (a silicon diode if a silicon transistor or a germanium diode if a germanium transistor) between the base of transistor 17 and terminal 19. The diode 39 is oriented to allow current to flow easily from base to ground. This diode splits the base current such that only approximately half of the normal base current will flow and thus only half of the collector current will flow. This allows longer integration times and more linear operating regions since the necessary base voltage can be applied but only half the base current will flow.

The present invention provides the unexpected result of extremely high accuracy operation even when employed to integrate input signals of relatively low voltage magnitudes. The non-linearities of a discharging capacitor and those of a grounded emitter transistor configuration when combined in accordance with the present invention as illustrated in FIGURES 1, 2 and 4 interact to produce the unexpected result of highly linear operation. The basic circuit, even without the aid of the tunnel diode, matches the accuracy of the most elaborate prior art devices and provides numerous other advantages thereover.

A circuit as illustrated in FIGURE 1 utilizing a General Electric 2N338 transistor, a 48 microfarad capacitor, a resistor 13 of 1 kilohm, a resistor 27 of 1 megohm, a resistor 23 of 500 kilohm and a charging pulse 12 of magnitude 10 volts and duration of 250 milliseconds, provided linear operating characteristics with a maximum deviation of 2%. This particular circuit is capable of handling an integration period of 10 seconds.

While the present invention has been described with respect to but a few embodiments, it will be appreciated that numerous modifications and variations are possible within the spirit and scope of the invention and thus it is not intended to limit the invention except by the terms of the following claims.

What is claimed is:

1. An electronic integrating circuit comprising a transistor having at least a base, a collector and an emitter, a tunnel diode having a first terminal connected to said emitter and a second terminal, a means for placing a voltage across said tunnel diode proportional to the voltage on said collector, a capacitor connected at one of its ends to said collector and at its other end to said second terminal of said tunnel diode, a means for biasing said base with operating voltage, a means for initially charging said capacitor, input terminal means coupled to said base for receiving signals to be integrated, and means for selectively measuring the voltage across said capacitor.

2. In an electronic integrating circuit the combination comprising a transistor having a base, a collector and an emitter, a capacitor connected between said emitter and said collector, means for selectively applying a voltage pulse to said capacitor to charge it to an initial voltage, means for biasing said base with operating voltage, current dividing means comprising a diode of the same semiconductor crystalline material as said transistor connected between said base and said emitter and oriented to permit current to flow from said base to said emitter, signal input terminal means including a first terminal coupled to said base and a second terminal coupled to the juncture between said capacitor and emitter for receiving a signal to be integrated subsequent to termination of said voltage pulse, whereby the charge remaining on said capacitor after a given time interval is indicative of the integral thereover of said signal.

3. An integrating circuit as defined in claim 2 wherein said means for biasing said base is a voltage square wave generator having a square wave voltage output greater than the magnitude of the cutoff voltage of said transistor.

4. An integrating circuit as defined in claim 2 wherein said means for biasing said base is a D.C. voltage supply coupled to said base, said supply being capable of applying a D.C. voltage thereto of a magnitude greater than the cutoff voltage of said transistor.

References Cited in the file of this patent

UNITED STATES PATENTS

| | | |
|---|---|---|
| 2,663,800 | Herzog | Dec. 22, 1953 |
| 2,675,469 | Harker et al. | Apr. 13, 1954 |
| 2,860,260 | Sykes | Nov. 11, 1958 |
| 2,889,467 | Endres et al. | June 2, 1959 |
| 2,891,174 | Hawkins | June 16, 1959 |